United States Patent [19]

Becker et al.

[11] Patent Number: 4,972,274
[45] Date of Patent: Nov. 20, 1990

[54] SYNCHRONIZING VIDEO EDITS WITH FILM EDITS

[75] Inventors: Stanley D. Becker, Portola Valley; Richard A. Bardini, San Jose, both of Calif.

[73] Assignee: Chyron Corporation, Melville, N.Y.

[21] Appl. No.: 164,271

[22] Filed: Mar. 4, 1988

[51] Int. Cl.[5] .............................................. G11B 27/02
[52] U.S. Cl. .................................... 360/14.1; 358/216; 358/903; 358/906; 360/3; 360/15; 369/84
[58] Field of Search ............ 358/214, 216, 244–244.2, 358/311, 335, 342, 345, 346, 903, 906; 360/3, 14.1–14.3, 15, 26, 33.1; 369/84, 85; 352/5, 12, 25, 31, 129

[56] References Cited

U.S. PATENT DOCUMENTS

| | | | |
|---|---|---|---|
| 3,919,474 | 11/1975 | Benson | 358/345 |
| 4,064,538 | 12/1977 | Broussand | 358/346 X |
| 4,402,018 | 8/1983 | Wada et al. | 358/346 X |
| 4,491,879 | 1/1985 | Fine | 360/14.1 |
| 4,496,990 | 1/1985 | Dyfverman | 358/310 |
| 4,496,991 | 1/1985 | Dyfverman | 360/14.1 X |
| 4,506,304 | 3/1985 | Harvey | 360/15 X |
| 4,587,572 | 5/1986 | DiGiulio | 360/14.3 |
| 4,709,277 | 11/1987 | Ninomiya et al. | 358/346 X |
| 4,746,994 | 5/1988 | Ettlinger | 360/13 |
| 4,754,342 | 6/1988 | Duffy | 358/335 X |
| 4,786,979 | 11/1988 | Claus et al. | 358/335 |
| 4,814,885 | 3/1989 | Beard | 358/216 X |
| 4,823,204 | 4/1989 | Holland | 358/216 X |

Primary Examiner—Alan Faber
Assistant Examiner—W. R. Young
Attorney, Agent, or Firm—Lerner, David, Littenberg, Krumholz & Mentlik

[57] ABSTRACT

An apparatus and process for providing an automated edit procedure between film and video formats is provided wherein a video edit becomes within one video field the exact replica of a film edit. Film frames (1/24th of a second) are read by video scans (1st and 2nd fields in 1/30th of a second) in a 3:2 pull down wherein successive movie frame scans are provided with four classes of video scans. These classes of video scans include (Class A) odd/even scans; (Class B) odd/even-/odd scans; (Class C) even/odd/scans; and, finally (Class D) even/odd/even scans. All edits are limited to film frame edits. Each time a film frame edit is converted to a video edit decision, the system looks at the edit out frame type and/or the edit in frame type and the cumulative current overall time differential between the video run time and the film run time for the edit. Frames are added or subtracted to keep the total error within + or − one field and a new cumulative error calculated for the next sequential edit. All edits are made between respective odd to even. The system is preferably used by taking a film edit decision list, recording the desired edit decisions on a film format with respect to a video master, and thereafter reprocessing those decisions in accordance with the protocol set forth above. There results a side-by-side video and film cut which are indistinguishable in temporal detectable sound and motion characteristics.

3 Claims, 3 Drawing Sheets

SYNCHRONIZING VIDEO EDITS WITH FILM EDITS

This invention relates to film video editing. Moreover, this invention relates to a scheme wherein film edit decisions are applied to both video and film so that the run time and edit points in both media are substantially identical.

STATEMENT OF THE PROBLEM

The problem addressed can be simply stated. Film frames change every 1/24th of a second. Video frames occupy approximately 1/30th of a second. Further, each video frame consists of two interleaved fields—an odd line field and an even line field. Each video field occupies 1/60th of a second. Unfortunately, field sequence is required. An odd field in the video media must be followed by an even field; an even field in the video media must be followed by an odd field.

It is desirable to edit identically between the film media and the video media. For example, a modern film editor includes recording film to a random access video disk and thereafter editing the film using the video disk recording. Upon completion of the video edit list, frames of film are discretely addressed and the compiled frame addresses can be used as a list enabling the cutting of film.

See Duffy U.S. Patent Application Ser. No. 851,079, filed 11 Apr. 1986 entitled Video Editing System Having Virtual Memory now U S. Pat. No. 4,754,342, issued June 28, 1988.

Unfortunately, in making such edit decisions, three occurrences—all of them bad—can cause cumulative error that ultimately destroys the temporal sequence of sound and motion between the film and video medias.

First, a film frame edit decision may require nonsequential video fields. That is two sequential odd fields or two sequential even fields occur. This is an illegal edit choice that will not be acceptable to the video media. Typically, a field must be added or subtracted in order to provide the required sequential fields for the video media.

Second, edits having an odd number of film frames can never have an exact video time equivalent. While 2/24th second film frames will always yield 5/60ths of a second video frames to give an exact time equivalent, the same can never be true for three film frames. Three/24th second film frames can occupy either 7/60th of a second video fields with a positive 8.3 milliseconds of time remaining or it can occupy 8/60th of a second video fields with a negative 8.3 milliseconds remaining.

Thirdly, a film frame edit may require both field 1 and field 2 editing.

The film/video editor as largely an artist is concerned with action and sound content. It will be understood that the cumulative run time errors between edits cannot possibly be accommodated in addition to the regular artistic editing decision making process.

Heretofore, film and video have each been separately edited.

Assuming that one were to confine the editor to edit sequences providing no time error, only edits with an even number of film frames starting at field 1 and ending at field 2 (with a sequential 2-1 outframe) will be conformed perfectly with no time compensation required. This edit has a probability of occurring 1 out of every 16 edits.

It is known to supply edits with the so-called random field 1, field 2 editing features. That is to say where an edit ends on 1 (say odd) field, the editor intelligently looks for the next sequential (say even) field. This feature will improve the probability of synchronous edits to 1 out of 4 edits. Nevertheless. a full ¾'s of the edits will contain time error accumulation.

Time edit errors do not uniformly accumulate. They instead accumulate as "random walks". That is to say, as the edit proceeds, time errors accumulate in a completely unpredictable manner. Motion becomes discernibly uncoupled from sound when the video and film media are compared.

There is a need to maintain synchronization between film and video edits. Many programs or TV subjects are originally shot on film, sound edited on film, and finally released on video only. However, with the advent of high fidelity television formats, maintenance of the original film with it high resolution becomes desirable. Such a maintenance is of little use where a re-editing of the material would be required for a second "high fidelity" release.

Further, electronic digital processing is ideal to the video media—but not possible without great difficulty in the film arts. Such examples can include geometric line fades, twisting of image fields and the like which are so easily done on a digital basis in the video media.

In short what sounds like a simple problem, the frame accurate conforming, between two audio visual medias—film and video—is anything but simple. Accordingly, the apparatus and process herein is directed at providing a necessary solution.

SUMMARY OF THE INVENTION

An apparatus and process for providing an automated edit adjustment procedure between film and video formats is provided wherein a video edit becomes within one video field the exact replica of a film edit. Film frames (1/24th of a second) are read by video scans (1st and 2nd fields in 1/30th of a second) in a 3:2 pull down wherein successive movie frame scans are provided with four classes of video scans. These classes of video scans include (Class A) odd/even (fld1/fld2) scans: (Class B) odd/even/odd (fld1,fld2fld1) scans; (Class C) even/odd/(fld2,fld1) scans; and, finally (Class D) even-/odd/even (fld2,fld2fld2) scans. All edits are limited to film frame edits. Each time a film frame edit is converted to a video edit decision, the system looks at the edit out frame class and/or the edit in frame class and the cumulative current overall time differential between the video run time and the film run time for the edit. Fields are added or subtracted to keep the total error within+or—one field and a new cumulative error calculated for the next sequential edit. All edits are made between respective odd to even. The system is preferably used by taking a film edit decision list, recording the desired edit decisions on a film format with respect to a video master, and thereafter reprocessing those decisions in accordance with the protocol set forth above. There results a side-by-side video and film cut which are indistinguishable in temporal detectable sound and motion characteristics.

OTHER OBJECTS, FEATURES AND ADVANTAGES

An object of this invention is to disclose a process of classifying film video edit decisions. All edit decisions are confined to film frame edit decisions. Each film frame is identified as a video scan type: there being four possible video scan types. Time errors in edits are accumulated in a counter. A protocol is disclosed where the run time error between the film and video is accumulated in a register. Knowing this run time error the system looks at either the film frame video scan type on the edit in or the edit out and adds or subtracts whole video fields to keep the time error to less than one video field. Thereafter the total run time error is recalculated and the process repeated.

An advantage of this process is that the edit decision is transparent to the editor. Consequently, sound edits on film and motion edits on video are interchangeable. Furthermore, an identical film record of a video release or a video record of the film release can be made at the time of the original edit.

A further advantage of this process is that it can be used to process existing edit lists stored in a virtual memory in intelligent film editors. Simply by placing enabling intelligence within the editor, existing edits can be processed for video film synchronization utilizing the apparatus and process set forth herein.

BRIEF DESCRIPTION OF THE DRAWINGS

Other objects, features and advantages of this invention will become more apparent after referring to the following specification and attached drawings in which:

Referring to FIG. 1 a film projector F takes film and plays the film to a video camera C. The camera has picture and sound and sound output to a video tape recorder (VTR) V. Synchronized sound is routed from Mag film player—to the VTR V. VTR plays through an optical lathe L to make a video disk D. Disk D is then used by editor E to generate via a computer an edit list. Edit list is placed in computer memory M.

The reader will understand that the disclosed invention can be utilized in two ways. It can be used when the edit list is first created. Alternately, the edit list can be completely created and thereafter processed in accordance with this invention.

Figure 1:
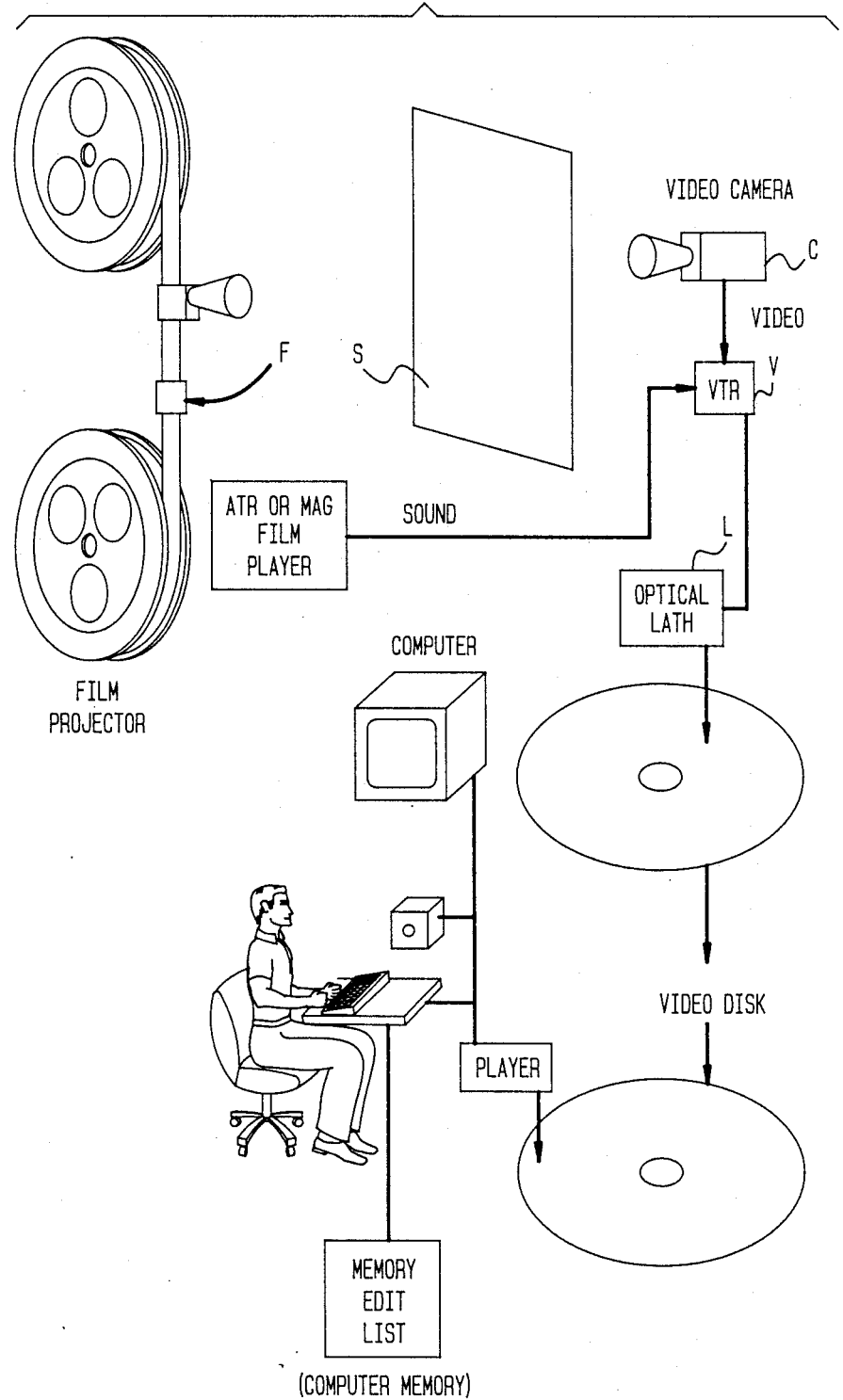
FIG. 1; is a schematic representation of the prior art editing process for the generation of an edit list from original film footage.
Figure 2:
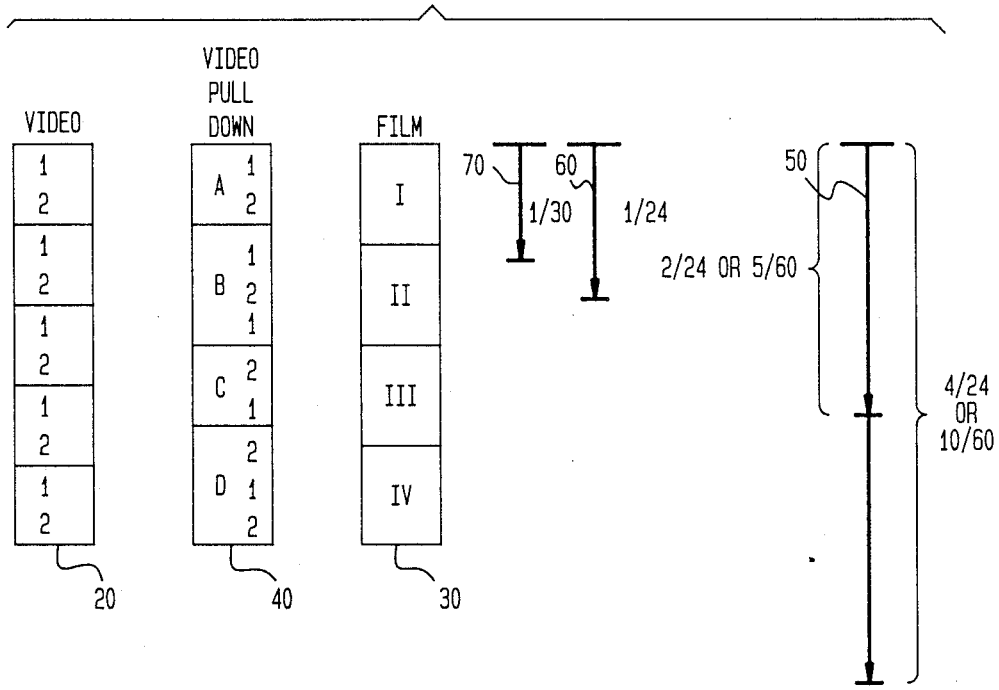
FIG. 2 is a schematic illustrating four film frames pulled down to ten video fields illustrating the four classes of film frame scans.

Referring to FIG. 2, a video tape 20 is illustrated along side of a film strip 30. A so-called video pull down tape 40 is illustrated therebetween. Referring to the right side of the diagram, a time vector 50 illustrates the problem. Specifically, a film frame occupies 1/24th of a second as is shown in vector 60. A video frame occupies 1/30th of a second as is shown in vector 70. In actual fact, each video frame consist of an odd line scan denominated by the numerals "1" on video tape 20 and an even line scan denominated by the numerals "2" on video tape 20.

By mathematics it can be seen that for every five video fields two full film frames occur. In other words. 2/24th of a second equals 5/60th of a second.

Further and referring to time arrow 50 at its full length, it can be seen that four film frames equal ten video fields. In other words. 4/24ths of a second (1/6) equals 10/60ths of a second (1/6).

Those familiar with the video arts know that video tapes must be sequential in the fields viewed. That is to say a video field taking 1/60th of a second and scanning odd lines must be followed by a video field taking 1/60th of a second which scans even lines.

Conversion of the film media to the video media has heretofore been on a 3:2 pull down convention. Specifically, film frame I is first scanned by an odd field and thereafter an even field. This is denoted for the purposes herein a Class A scan.

Film frame II is scanned by an odd and an even and then an odd scan. This is denoted for the purposes here as a Class "B" scan.

Film frame III is scanned by first an even and thereafter an odd scan. This is denoted herein as a Class "C" scan.

Finally, film frame IV is scanned by first an even scan, then an odd scan and finally an even scan. This is denoted herein as a class "D" scan.

It can be seen that the sequence of the various class scans is continually repeating. That is to say, a Class D scan is thereafter followed by an A scan with the sequence endlessly repeating. It will further be realized that if scans end at a "D" frame and always begin at an "A" frame, no timing problem will be present.

Unfortunately, the video editor cannot coincide his edit decisions with this kind of severe restriction. The mandate of making artistic cuts of film to video or video to film requires that full attention be paid to the artistic and cuts and that restriction not be made to a known frame which is 1 out of every 4. Consequently, the disclosed film editing system is set forth to reduce any error that is generated by such random cuts.

FIG. 2 illustrates all possible In and Out edit points and the tape frame that would most closely correspond to the selected film frame. Noted is the accuracy of the video edit point when reference to film.

The 16 combinations of In and Out points are tabulated in Table 1 as follows.

TABLE 1

| IN | OUT | TOTAL EDIT ERROR | EDIT ERROR COMPONENTS |
|---|---|---|---|
| AIN | AOUT | $-\frac{1}{2}$ fld | $0 + (-\frac{1}{2})$ |
| AIN | BOUT | $-1$ fld | $0 + (-1)$ |
| AIN | COUT | $+\frac{1}{2}$ fld | $0 + (+\frac{1}{2})$ |
| AIN | DOUT | $0$ | $0 + 0$ |
| BIN | AOUT | $0$ | $(+\frac{1}{2}) + (-\frac{1}{2})$ |
| BIN | BOUT | $-\frac{1}{2}$ fld | $(+\frac{1}{2}) + (-1)$ |
| BIN | COUT | $+1$ fld | $(+\frac{1}{2}) + (+\frac{1}{2})$ |
| BIN | DOUT | $+\frac{1}{2}$ fld | $(+\frac{1}{2}) + (0)$ |
| CIN | AOUT | $-1\frac{1}{2}$ fld | $(-1) + (-\frac{1}{2})$ |
| CIN | BOUT | $-2$ fld | $(-1) + (-1)$ |
| CIN | COUT | $-\frac{1}{2}$ fld | $(-1) + (+\frac{1}{2})$ |
| CIN | DOUT | $-1$ fld | $(-1) + (0)$ |
| DIN | AOUT | $-1$ fld | $(-\frac{1}{2}) + (-\frac{1}{2})$ |
| DIN | BOUT | $-1\frac{1}{2}$ fld | $(-\frac{1}{2}) + (-1)$ |
| DIN | COUT | $0$ | $(-\frac{1}{2}) + (\frac{1}{2})$ |
| DIN | DOUT | $-\frac{1}{2}$ fld | $(-\frac{1}{2}) + (0)$ |

The uncorrected video tape equivalent edit point is derived mathematically by taking the number of film frames from the reference to the edit point (either in or out) and multiplying by 5/4 to get the number of television frames and adding the result to the reference.

The computation will yield the video frame which first scans the selected film frame in a 1/2 sequence with "In" on fld 1 and out on fld 2.

For example the calculation for the video edit point is 5/4 the number of film frames from ref (round if >0.5 with an A Ref).

If the in point is film frame 4 then the video edit at:

5/4 (4)=5 video frames (Time Code #04)

Figure 3:
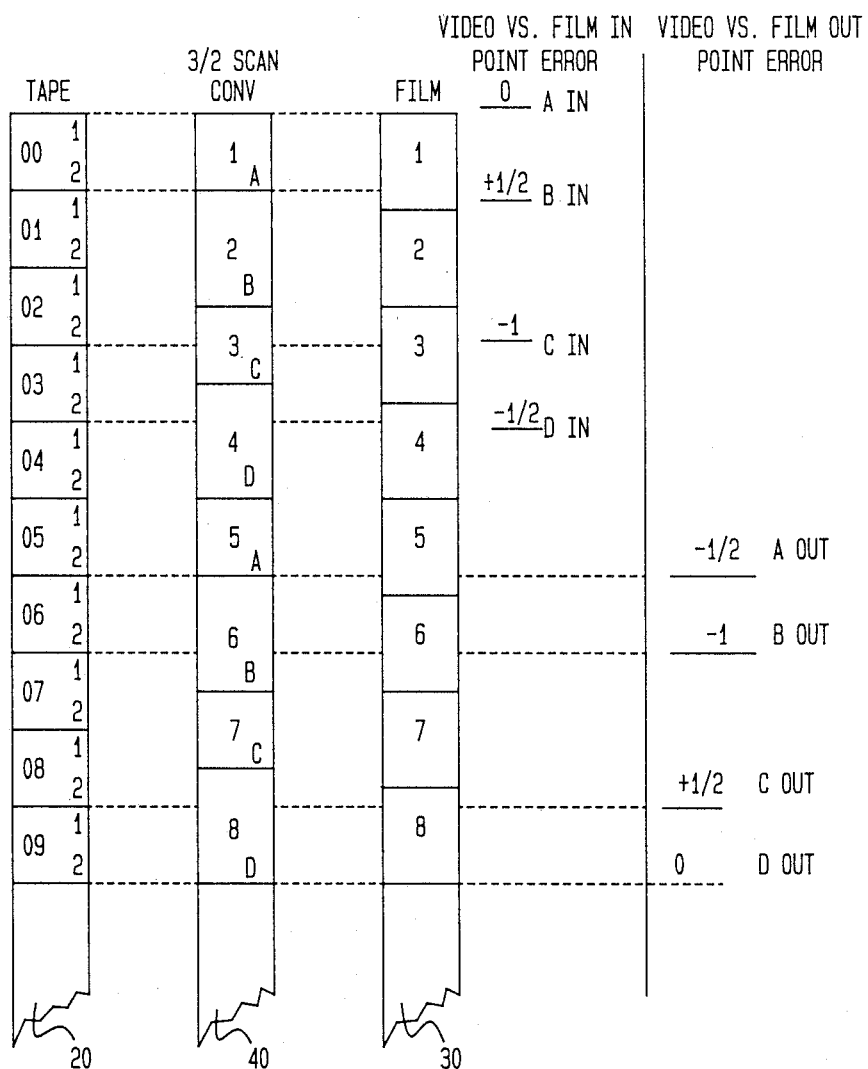
FIG. 3 is a diagram illustrating the possible types of In and Out video edits on converted film material.

You will note from FIG. 3 that this point is ½ fld after the actual start of film frame 4 introducing a ½ fld edit error.

If the out is film frame 6 then the video edit is:

5/4 (6)=7.5 or 7 video frames (Time Code #06)

You will note from FIG. 3 that this point is 1 field earlier than the end of the actual film frame edit point.

Thus the video edit is a total of 1½ flds shorter than the equivalent film edit.

Analysis will illustrate that the tabulation in Table 1 constitute all possible cases that can occur in any video sequence. Making this realization, the invention can be understood.

A time register is utilized. This time register is cumulative. That is to say, it accumulates all error in a sequence of video cuts.

Edit decisions are made. These edit decisions are made to keep the time error within a limit of + or −one field. It has been found that this time limit causes minimal error.

Referring to FIG. 3, the process can be derived from the specific cases here involved. It can be seen that by choice of an edit to maintain an accumulator egister to the smallest value (less than+or−one field). the editing process can be illustrated.

What follows will be short English interpretations of the actual program written in "C" code. Thereafter, examples will be utilized referring to FIG. 3.

PROGRAM
```
Code
Correction:
{
    Get current edit error accumulation value (ACUM_E);
    Save current edit error accumulation value
        (PRE_ACUM_E = ACUM_E);
    Add correction to total error accumulated
        ACUM_E = PRE_ACUM_E + CURR_ERR or
        (ACUM_E + = CURR_ERR). See figure to
        calculate CUR_ERR;
If ((total error accumulated (ACUM_E) > 1 field) &&
(new edit duration > 4 fields))
    {
    if (out point of new edit is a "C" frame)
        {
        Adjust out frame of shot −2 fields;
        Adjust total error accumulated (ACUM_E)
            by −2 fields;
        }
    End of Code
```

END OF CODE

In the above program, the program tests to see whether accumulated error is more than +1 television field. Of necessity, the edit duration must exceed two fields else the correction could eliminate the edit entirely. Greater than four fields was an arbitrary compromise duration based on edit content and accuracy.

For the purposes of an example, let us consider the case of the beginning of edit. No time error will be present and the tape will commence running at frame 00, the telecine (film to tape conversion device) will scan an A frame an film will start running from frame 1.

An edit is desired at film frame one. This In Edit will be seen to occur at an A frame, zero time error. That is to say projecting the start of video frame 1 across to the start film frame 1 it can be seen that no time error occurs.

An out edit is desired after the third film frame. This out edit will be seen to occur at point C frame type +½ a frame interval. That is to say projecting the end of the video of frame 03 across to the film at frame 3 it can be seen that half a field of run time error occurs. Thus, at the end of this edit. ½ a field of error will be accumulated.

Repeating the same edit again will result in the same error being accumulated again. At the end of the second C. edit out one full video field of error will be accumulated. Repeating the same edit a third time will call the conditional "if" statement of the program language.

The "if" statement is simple. If there is a total error of greater than one field accumulated, i.e., previous error+current error, in the error register and the out frame is a "C" frame, the out frame will be adjusted—two fields and the total error accumulated by—two fields. Therefore, this edit will cease at frame 02 at the end of the second field. Having taken away two fields, the error accumulated will be adjusted by two fields, however, the editorial content, i.e., seeing film frame 3, will be preserved.

A second case for exceeding the greater than +1 frame error condition would occur if the in edit was a B frame. This condition is present in the following code:

```
Code
else if (in point of new edit is a "B" frame)
    {
    Adjust in frame of shot +2 fields;
    Adjust total error accumulated (ACUM_E) by −2 fields;
    }
End of Code
```

END OF CODE

If the IN edit is a B frame and the total error accumulated as before is greater than one field, the IN edit will be adjusted by two fields. That is to say, referring to FIG. 3, the 01 video frame of the B type disk scan will be omitted. The B scan will begin with an 02 video tape. Again the editorial content is maintained by retaining a scan of picture frame 2.

```
else /* the prior edit being a short duration edit. */
    {
    Adjust out frame of shot −2 fields;
    Adjust total error accumulated (ACUM_E) by −2 fields;
    }
}
```

```
Code
else if ((total error accumulated (ACUM_E) < −1 field) &&
        (new edit duration > 4 fields))
    {
    if (previous accumulated error (PRE_ACUM_E) is
        <= −1 field)
```

```
{
if (in point of new edit is a "C" frame)
    {
    Adjust in frame of shot −2 fields;
    Adjust total error accumulated (ACUM_E) by
        +2 fields;
    }
else if (out point of new edit is a "B" frame)
    {
    Adjust out frame of shot +2 fields;
    Adjust total error accumulated (ACUM_E) by
        +2 fields;
    }
else if (in point of new edit is a "D" frame)
    {
    Adjust in frame of shot −2 fields;
    Adjust total error accumulated (ACUM_E)
        by +2 fields;
    }
else /* out point of new edit must be a "A" frame or
        because the prior edit being a short duration
        edit. */
    {
    Adjust out frame of shot +2 fields;
    Adjust total error accumulated (ACUM_E) by
        +2 fields;
    }
}
End of Code
```

END OF CODE

In the above program, the program tests to see whether the total accumulated error is less than −1 television field and the previous accumulated error is less than or equal to −1 television field. Such a condition can be created by a series of C in and D out edits. After the first edit a −1 field error is left in the accumulator register. The second C In and D Out edit will call the conditional if statement of the program language.

The code is self-explanatory. If the in point is a "C" frame for example film frame 3 and tape frame 03 in FIG. 3, the in frame is adjusted −2 fields, i.e., the in frame is 02. Thus the error is adjusted by +2 fields.

The other conditional statements follow a similar pattern. The order of the test is such that the adjustment create the smallest change in editorial content.

```
Code
else /* previous accumulated error (PRE_ACUM_E) is >
        −1 field */
    {
    if (out point of new edit is a "B" frame)
        {
        Adjust out frame of shot +2 fields;
        Adjust total error accumulated (ACUM_E)
            by +2 fields;
        }
    else if (in point of new edit is a "C" frame)
        {
        Adjust in frame of shot −2 fields;
        Adjust total error accumulated (ACUM_E) by
            +2 fields;
        }
    else if (in point of new edit is a "D" frame)
        {
        Adjust in frame of shot −2 fields;
        Adjust total error accumulated (ACUM_E) by
            +2 fields;
        }
    else /* out point of new edit must be a "A" frame or
            because the prior edit being a short
            duration edit. */
        {
        Adjust out frame of shot +2 fields;
        Adjust total error accumulated (ACUM_E) by
            +2 fields;
        }
    }
}
End of Code
```

In the program a test is made to see whether the total error is $< -1$ field and if the previous accumulated is greater than $-1$ field (i.e., error equal $-\frac{1}{2}$, 0 or $+\frac{1}{2}$).

The code is self-explanatory. Again the system examines the in and out type of frame and adjust the edit by adding 2 fields to keep the total accumulated error to + or −1 field.

```
Code
else /* accumulated error is >= −1 field AND <= +1 field OR
        new edit duration is <= 4 fields */
    }
    /* No adjustment is made. */
    }
}
End of Code
```

For all other cases where the error is equal to or more than −1 field (in the direction of no error) or equal to or less than +1 field no adjustment need be made. In other words, all other cases constitute an error condition no greater than 1 field.

It can be seen by the enclosed diagrammatic examples that two phenomena are present. First, classification of the video pull downs has occurred.

Second, and based on either the out frame of the video pull down or the in frame of the video pull down, time adjustment has been made. This time adjustment has been made always in increments of two fields. By restricting the increments to two fields, the odd/even sequence is avoided, while the discrimination in sound and time sequence is always held to + or −one (1) video field.

What is claimed is:

1. A process of synchronizing in time video edits with film edits wherein the video format includes odd and even 1/60th second sequential interleaved video fields and the film frames include sequential 1/24th second film frames the steps of:

correlating said video fields to said film frames with a three/two pull down;

providing film frame edit decisions defining edits and specifying IN and OUT film frames for each such edit;

converting each film frame edit to an uncorrected video edit specifying uncorrected IN and OUT video frames corresponding to the IN and OUT film frames of the edit, respectively;

classifying the IN and OUT film frames for each edit into video pull down classes of the film frames, the video pull down classes consisting of odd/even scans, odd/even/odd scans, even/odd scans, and even/odd/even scans;

determining a time error for each edit based upon said classifications of said IN and OUT film frames of the film frame edit, said time error corresponding to the difference between the running time of the uncorrected video edit and the running time of the film frame edit;

accumulating said time errors to thereby provide an accumulated error;

determining when said accumulated error is greater than plus or minus one video field; and where said accumulated error exceeds more than plus or minus one video field changing and uncorrected video edit by one full video frame by adding or subtracting one full video frame to thereby reduce said accumulated error to less than one video field.

2. A method as claimed in claim 1 wherein said step of changing an uncorrected video edit includes the step of selecting a particular video frame to be added or subtracted depending upon the classifications of the IN and OUT frames in the corresponding film edit.

3. A method as claimed in claim 2 wherein said step of providing film frame edit decisions includes the step of providing a prerecorded film edit decision list representing film edit decisions made prior to said converting, classifying, determining, accumulating and changing steps.

* * * * *

UNITED STATES PATENT AND TRADEMARK OFFICE
CERTIFICATE OF CORRECTION

PATENT NO. : 4,972,274

DATED : November 20, 1990

INVENTOR(S) : Becker et al

It is certified that error appears in the above-identified patent and that said Letters Patent is hereby corrected as shown below:

Title Page:
In the abstract, line 10, "even/odd/scans" should read --even/odd scans--.

Column 2, line 49, "(fld1,fld2fld1)" should read --(fld1,fld2,fld1)--.
        line 50, after "odd" delete "/".
        line 51, "(fld2,fld2fld2)" should read --(fld2,fld1,fld2)--.

Column 3, line 44, delete "and sound and sound".

Column 5, line 35, "egister" should read --register--.

Column 5, line 51, "CUR" should read --CURR--.

Column 8, line 46, after "frames" insert --said process comprising--.

Signed and Sealed this

Twenty-eighth Day of July, 1992

Attest:

DOUGLAS B. COMER

Attesting Officer      Acting Commissioner of Patents and Trademarks